United States Patent
Zhang et al.

(10) Patent No.: US 7,244,372 B2
(45) Date of Patent: Jul. 17, 2007

(54) METHOD FOR INCREASING STABILITY OF COOLING FLUID FOR ENGINE

(75) Inventors: Chunhui Zhang, Beijing (CN); Kaijiao Zhang, Beijing (CN); Jianfeng Guo, Beiing (CN); Wanying Li, Beijing (CN); Yunchang Song, Beijing (CN); Bing Yang, Beijing (CN)

(73) Assignee: Great Wall Lubricating Oil Application Research Center Co. Ltd., Beijing (CN)

( * ) Notice: Subject to any disclaimer, the term of this patent is extended or adjusted under 35 U.S.C. 154(b) by 273 days.

(21) Appl. No.: 11/126,489

(22) Filed: May 11, 2005

(65) Prior Publication Data

US 2006/0017044 A1    Jan. 26, 2006

(30) Foreign Application Priority Data

Jul. 23, 2004    (CN) .................. 2004 1 0009364

(51) Int. Cl.
*C09K 5/20* (2006.01)
*C09K 5/00* (2006.01)

(52) U.S. Cl. ............... 252/75; 252/70; 252/71; 252/73; 252/74; 252/76

(58) Field of Classification Search ......... 252/70, 252/71, 73, 74, 75, 76
See application file for complete search history.

(56) References Cited

U.S. PATENT DOCUMENTS

| | | | | |
|---|---|---|---|---|
| 4,426,309 A | * | 1/1984 | Abel et al. ................. | 252/75 |
| 4,564,465 A | * | 1/1986 | Bibber ................. | 252/389.62 |
| 4,686,059 A | * | 8/1987 | Payerle ................. | 252/75 |
| 4,869,841 A | * | 9/1989 | Matteodo et al. ........ | 252/79 |
| 4,873,011 A | * | 10/1989 | Jung et al. ............... | 252/75 |
| 5,076,951 A | * | 12/1991 | Miles et al. ............. | 252/79 |
| 5,454,967 A | * | 10/1995 | Pfitzner et al. .......... | 252/78.5 |
| 5,489,391 A | * | 2/1996 | Nawa et al. ............. | 252/75 |
| 5,718,836 A | * | 2/1998 | Nakatani et al. ......... | 252/74 |
| 5,811,025 A | * | 9/1998 | Kawai et al. ............ | 252/70 |
| 6,059,996 A | * | 5/2000 | Minks et al. ............ | 252/395 |
| 6,309,559 B1 | * | 10/2001 | Minks et al. ............ | 252/75 |
| 6,733,687 B1 | * | 5/2004 | Hudgens ................ | 252/73 |
| 6,818,147 B2 | * | 11/2004 | Wenderoth et al. ...... | 252/73 |
| 6,953,534 B1 | * | 10/2005 | Hudgens ................ | 252/73 |
| 2004/0026656 A1 | * | 2/2004 | Hafner et al. ........... | 252/71 |
| 2006/0033077 A1 | * | 2/2006 | Hudgens ................ | 252/75 |
| 2006/0237685 A1 | * | 10/2006 | Egawa et al. ........... | 252/71 |
| 2006/0237686 A1 | * | 10/2006 | Egawa et al. ........... | 252/71 |
| 2006/0273283 A1 | * | 12/2006 | Egawa et al. ........... | 252/74 |

FOREIGN PATENT DOCUMENTS

DE    3148230 A1 *  6/1983
DE    19546472 A1 *  6/1997

OTHER PUBLICATIONS

DERWENT-ACC-No. 2004-466224, Abstract of Russian Patent Specification No. 2213119 C2 (Sep. 2003).*

* cited by examiner

*Primary Examiner*—Anthony J. Green
(74) *Attorney, Agent, or Firm*—Ladas & Parry LLP

(57) ABSTRACT

The present invention relates to a method for increasing the stability of cooling fluid for the engine. This invention selects the most preferred conditions, e.g. the composition of the solution, pH value, means and amount of addition, and proportion of silicate added, so that the products thereof have excellent properties for inhibiting corrosion for many kinds of metals, being with low costs and good storage stability. Moreover, since this method is simple, it is easy to be put into practice and utilized.

10 Claims, No Drawings

METHOD FOR INCREASING STABILITY OF COOLING FLUID FOR ENGINE

TECHNICAL FIELD

The present invention relates to a method for increasing the stability of cooling fluid for the engine.

BACKGROUND OF THE INVENTION

Cooling fluid widely used at present is low in price, has good in anti-corrosive performance and the raw materials are easily available. However, it does not have good stability due to the presence of compositions of silicates and 2-mercaptobenzothiazole.

Silicate is a kind of special efficient corrosion-inhibiting agent for aluminum and alloys thereof. It has certain protective capability for steel and iron, as well as non-ferrous metals. It not only possesses buffer function, but also is extremely cheap. In the past several decades, it has been extensively applied in various fields for protecting from corrosion. However, the main problem of silicates in the course of application is that their stability decreases after they have been stored or used for a period of time and a gel-like precipitation readily separates. As a result, their inhibition capability is decreased. Moreover, the said gel-like precipitation may block-up the water channels of the engine and also adhere to the surface of the radiator during operation so as to reduce the heat transfer effect and make engine overheat. The instability of the silicates is caused by precipitated silicate gel and the precipitation of the reaction products of silicate with calcium, magnesium ions etc. contained in hard water. The latter can be dealt with by controlling the hardness of the water. However, the situation is comparatively complicated for silicate gel. In general, it is believed that the silicates aggregate per se or conduct reaction to form particulates. The particles agglomerate to form branched chain and then network structures, and finally gel is separated. With the rapidly development of the auto engine industry, engine power is increasing. In order to reduce windage coefficient, a streamlined shape is generally designed. It makes the sizes of the radiator and water tank smaller and smaller. Thereby, the heat-load of the engine is gradually increased. For the purpose of reducing the weight of the vehicles bodies and increasing economy of the fuel, not only a great amount of aluminum alloy is used for engine's cooling system, but also the other parts of the engines are gradually aluminum-metallized. Now an all-aluminum engine has been put on market. Research on the protection from corrosion of aluminum is now becoming a key importance in various countries.

2-mercaptobenzothiazole is an especially efficient inhibiting agent for copper or alloys thereof, and easily conducts a photosensitive reaction to produce precipitates—a factor influencing stability. Therefore, it is a very important object to increase the stability of cooling fluid for the engine.

DESCRIPTION OF THE INVENTION

The object of the present invention is to solve the above-mentioned problems by providing a method for improving stability of cooling fluid for the engine and thereby to solve the problem of poor stability. According to the invention, the duration of stabilization of the fluid has been increased from several hours to over one year. The object of the present invention is achieved by the following technical solutions.

A method for increasing the stability of the cooling fluid for engine, which is conducted by using the materials in the following weight by part and steps:

| | |
|---|---|
| Ethylene glycol: | 600-1200 parts |
| Deionized water: | 800-1400 parts |
| Sodium silicate: | 1-3 parts |
| Sodium phosphate: | 1-10 parts |
| Sodium borate: | 1-10 parts |
| 2-mercaptobenzothiazole: | 1-5 parts |
| Benzotriazole: | 1-5 parts |
| Citric acid: | 1-5 parts |
| Sodium benzoate: | 1-10 parts |
| Sodium hydroxide: | 1-5 parts |
| Silicate stabilizing agent: | 1-3 parts |
| Defoaming agent: | 0.1-0.3 parts |
| Dye | 0.1-0.3 parts | and by the following steps:

a) in a mixer, 1-10 parts of sodium phosphate, 1-10 parts of sodium borate, 1-5 parts of benzotriazole, 1-10 parts of sodium benzoate and 80% of 800-1400 parts of deionized water are added at one time with stirring, and a solution is ready for use after all the materials are dissolved completely;

b) 1-5 parts of citric acid is added to the solution of a) with stirring, and a solution of b) is ready for use after all the materials are dissolved completely;

c) then, in a separate mixer, 1-5 parts of 2-mercaptobenzothiazole, 10% of 800-1400 parts of deionized water and 1-5 parts of sodium hydroxide are mixed with stirring, heated to boiling, and added, while still hot, to the solution of b);

d) 1-3 parts of silicate stabilizing agent is added to the solution of c) over 30 minutes with stirring, the pH of the solution of d) is adjusted to 8-9 with sodium hydroxide;

e) in another separate mixer, 1-3 parts of sodium silicate and 10% of 800-1400 parts of deionized water are added with stirring until the materials are dissolved; then said materials are added to the solution of d) over 30 minutes with stirring; wherein the pH of the obtained mixture is adjusted with sodium hydroxide to 10-11 after the mixture is mixed homogeneously; wherein the solution of e) is ready for use; and f) finally, the solution of e) is added to 600-1200 parts of ethylene glycol, 0.1-0.3 parts of defoaming agent and 0.1-0.3 parts of dye with stirring until the final cooling fluid is homogeneously obtained.

The silicate stabilizing agent is 3-(trihydroxymethylsiloxane)-propyl-monoester of phosphoric acid-phosphate; sulfonate-propylsiloxane; 2-(sodium-sulfophenyl) ethylsiloxane; 3-(sodium sulphonate) propylsiloxane; 3-(sodium sulphonate-2-hydroxyl-propoxy) propylsiloxane or (2,3-dihydroxylpropoxy) propylsiloxane. The defoaming agent is block polyether.

The method according to the present invention is based on the fact that the gel is formed from silicate and 2-mercaptobenzothiazole.

Upon investigation and study, it is found that, among the factors influencing the growth of agglomerating silicate particle, the higher pH value will produce smaller diameter agglomerating silicate particles and higher silicate solubility. Next, where the pH value is higher than 11, there will be no gel separated in the silicate solution. Therefore, the separation of silicate gel can be controlled by pH value. When the pH value of the cooling fluid is higher than 11, the separation of the silicate gel can be kept down. However, in the case of high pH value the high lead-containing solder in the metal of the cooling system will exhibit serious slag-formation and blooming, leading to leakage. So the method of controlling pH value cannot be used generally. Moreover, the high silicate concentration of the solution will increase the collision probability against one another between the particles that will lead to more opportunities for separation of the silicate gel. The last but the most efficient method currently used is to use silicate-stabilizing agent. Such stabilizing agent can be drawn to the surface of the silicate colloidal particles to prevent effective collisions between the particles by means of electrostatic and steric hindrance, and reduce the occurrence of irreversible insoluble silicate aggregates. The separation of the silicate gel will be effectively controlled by keeping the silicate colloidal particles within a certain size so as to keep said particle soluble. In the tests the most preferred conditions, e.g. the composition of the solution, pH value, means and amount of addition, and proportion of silicate added have been selected.

The cooling fluid for engines in the method according to the present invention is silicon-phosphorus-boron (Si—P—B) type fluid, currently the most popular one on the market. The formulation of which is as follows:

| | |
|---|---|
| Ethylene glycol: | 600-1200 parts |
| Deionized water: | 800-1400 parts |
| Sodium silicate: | 1-3 parts |
| Sodium phosphate: | 1-10 parts |
| Sodium borate: | 1-10 parts |
| 2-mercaptobenzothiazole: | 1-5 parts; |
| Benzotriazole: | 1-5 parts |
| Citric acid: | 1-5 parts |
| Sodium benzoate: | 1-10 parts |
| Sodium hydroxide: | 1-5 parts |
| Silicate stabilizing agent: | 1-3 parts |
| Defoaming agent: | 0.1-0.3 parts |
| Dye: | 0.1-0.3 parts |

Among the materials, the silicate stabilizing agent 3-(trihydroxymethylsiloxane)-propyl-monoester of phosphoric acid-phosphate are produced by Dow Corning Corp. of the US, while sulfonate-propylsiloxane, 2-(sodium-sulfophenyl) ethylsiloxane, 3-(sodium sulphonate) propylsiloxane, 3-(sodium sulphonate-2-hydroxylpropoxy) propylsiloxane and (2,3-didyhydroxylpropoxy) propylsiloxane are produced domestically.

2-mercaptobenzothiazole, also called benzothiazolinone or vulcanization accelerating agent, is produced by Shenyang Northeast Assistants Plant in China. There are many other producers in China as well.

The defoaming agent block polyether with the trade name of PE6100 is available from BASF of Germany.

Method of Testing:

The test for stability of cooling fluid is carried out by the method for the test of silicate stability by Dow Corning Corp. with the specific steps as follows: in a wide-mouth beaker the sample for test is sealed and heated in an oven at 66±2□. The time for stability is that every 36 hours corresponds to one month under practical use and storage conditions. The qualified criterion is 18 days.

Contents Description of Testing:

1. The ratio of the amounts of silicate stabilizing agent to silicate added and pH value of the solution when silicate is added. Sulfonate-propylsiloxane are used as the silicate stabilizing agent. The result of the tests is shown in Table 1.

TABLE 1

Ratio of amounts of silicate stabilizing agent to silicate added and the pH value of solution when silicate is added

| Ratio amounts of silicate stabilizing agent to silicate added | pH value of solution when silicate is added | Duration of stability of silicate |
|---|---|---|
| 2:1 | 7-8 | 16 hrs |
| | 8-9 | 22 hrs |
| 1:1 | 7-8 | 5 days |
| | 8-9 | 7 days |
| 2:1 | 7-8 | 5 days |
| | 8-9 | 7 days |

It is known from Table 1 that the most effective and economic ratio of amounts of silicate stabilizing agent to silicate added is 1:1. The effect is not obvious when more silicate stabilizing agent is added. The effect of the stabilizing agent is better when silicate is added such that the pH of the solution is between 8 and 9.

2. Test for Velocity of Adding Silicate Stabilizing Agent

On the basis of the result of test 1, the ratio of amounts of silicate stabilizing agent to silicate added is set at 1:1 and the pH solution is at 8-9 when silicate is added, select velocities for adding silicate and silicate stabilizing agent. The result is shown in Table 2.

TABLE 2

Test Results for velocities of adding Silicate Stabilizing Agent and silicate

| Velocities of adding silicate stabilizing agent | Velocity of adding Silicate | Duration of stability of silicate |
|---|---|---|
| Rapidly adding at one time | Rapidly adding at one time | 7 days |
| | Adding over 10 minutes. | 33 days |
| | Adding over 30 minutes. | 93 days |
| Adding over 10 minutes. | Rapidly adding at one time | 9 days |
| | Adding over 10 minutes. | 110 days |
| | Adding over 30 minutes. | 188 days |
| Adding over 30 minutes. | Rapidly adding at one time | 9 days |
| | Adding over 10 minutes. | 136 days |
| | Adding over 30 minutes. | 217 days |

It is known from Table 2 that the slower the silicate and silicate stabilizing agent are added, the better the effect of the stabilizing agent will be.

3. Selecting pH Value of the Final Solution

In order to obtain better test results, the results of the above test are applied. The ratio the amounts of silicate stabilizing agent to silicate added is set at 1:1 and pH of solution at 8-9 when silicate is added. Both velocities of adding silicate and silicate stabilizing agent are set at half an hour. Screen out pH value of the final solution. The results are set forth in Table 3.

TABLE 3

Test Results for Stability of Silicate

| pH value of final solution | Duration of stability of silicate |
|---|---|
| 9-10 | Not less than one year |
| 10-11 | Not less than 2 years |

It is known from Table 1, 2 and 3 that the silicate stability of the cooling fluid for engine will be the best when the pH value of the final solution is 10-11, the ratio of the amounts of silicate stabilizing agent to silicate added is set at 1:1, the pH of the solution set at 8-9 when silicate is added and velocities for adding silicate and silicate stabilizing agent are half an hour.

The cooling fluid for engine prepared in accordance with the present invention is evaluated by using the standard of ASTM D3306. The results are shown in Table 4.

TABLE 4

Results of Standard Evaluation

| Title of Experiment | | Results of Experiment | Standard Required |
|---|---|---|---|
| Corrosion of cast aluminum alloys under heat-transferring condition | | 0.20 mg/cm$^2$ | $\leq 1.0$ |
| Corrosion of Aluminum pump under cavitation condition | | Grade 10 | Not lower than Grade 8 |
| Corrosion test in glassware (mg) | Copper | −1.2 | ±10.0 mg |
| | Brass | −1.4 | ±10.0 mg |
| | Steel | +1.1 | ±10.0 mg |
| | Cast aluminum | −1.1 | ±30.0 mg |
| | Solder | +0.2 | ±30.0 mg |
| | Cast iron | −0.2 | ±10.0 mg |
| | Copper | −4.1 | ±20.0 mg |
| | Brass | −2.6 | ±20.0 mg |
| | Steel | −1.4 | ±20.0 mg |
| | Cast aluminum | −0.9 | ±60.0 mg |
| | Solder | −0.6 | ±60.0 mg |
| | Cast iron | −2.9 | ±20.0 mg |

It is known from the data of Table 4 that this cooling fluid has excellent property for inhibiting corrosion for many kinds of metals, such as solder, brass, red copper, aluminum, cast iron and steel. The weight loss of the test block is much lower than the requirement, especially the protection for aluminum.

The present invention also employs the method of heating 2-mercaptobenzothiazole to boiling to prevent it from precipitation due to photosensitive reaction so as to increase the stability of the cooling fluid.

As the above-mentioned technical solutions have been used, the present invention, when compared with the prior art, possesses the following advantages and effects:

a) The products according to the present method have excellent corrosion-inhibiting function for solder, aluminum, brass, red copper, steel and iron. The inventive method can provide long-term inhibition protection for aluminum metal by modifying the method. The costs of products are very low and the storage stability can be increased to over one year. It can prevent silicate gel from precipitating.

b) Because this method is simple, it is easy to be put into practice and become utilized.

EXAMPLES

Example 1

In a mixer, 1 kg of sodium phosphate, 10 kg of sodium borate, 1 kg of benzotriazole, 1 kg of sodium benzoate and 640 kg of deionized water are added simultaneously and stirred until all the materials are completely dissolved and the solution is ready for use. Then 5 kg of citric acid is added to the solution with stirring until all the materials are completely dissolved and the solution is ready for use. In a separate mixer, 1 kg of 2-mercaptobenzothiazole, 80 kg of deionized water and 5 kg of sodium hydroxide are added simultaneously, stirred and heated till boiling, and immediately added to the above-mentioned ready-for-use content while they are still hot. Also in the above-mentioned content, 1 kg of 3-(trihydroxymethylsiloxane)-propane-monoester of phosphoric acid-phosphate is added over 30 minutes with stirring and adjust pH of the mixture to 8. In a separate mixer, 1 kg of sodium silicate and 80 kg of deionized water are added with stirring; after the materials are dissolved, the solution is added to the above-mentioned content over 30 minutes with stirring; and the pH of the mixture is adjusted to 11 with sodium hydroxide after the content is mixed homogeneously, and is ready for use. Finally, 600 kg of ethylene glycol, 0.1 kg of block polyether and 0.3 kg of dye are added to the just ready content with stirring to obtain the final product.

Example 2

In a mixer, 3 kg of sodium phosphate, 8 kg of sodium borate, 2 kg of benzotriazole, 3 kg of sodium benzoate and 800 kg of deionized water are added simultaneously with stirring until all the materials are completely dissolved and the solution is ready for use. Then, 4 kg of citric acid is added to the dissolved materials with stirring until all the materials are completely dissolved and the solution is ready for use. In a separate mixer, 2 kg of 2-mercaptobenzothiazole, 100 kg of deionized water and 4 kg of sodium hydroxide are added simultaneously, stirred and heated till boiling, and immediately added to the above-mentioned ready-for-use content while they are still hot. Also in the above content, 2 kg of sulphonate□propylsiloxane is added over 30 minutes with stirring until pH of the solution is adjusted to 9 with sodium hydroxide. In a separate mixer, 2 kg of sodium silicate and 100 kg of deionized water are added with stirring; after the materials are dissolved, the solution is added over 30 minutes to the solution obtained from last step and continue to stir; and the pH of the solution is adjusted to 10 with sodium hydroxide after the content is mixed homogeneously, and the solution is ready for use. Finally, 700 kg of ethylene glycol, 0.15 kg of block polyether and 0.25 kg of dye are added to the just ready content with stirring to obtain the final product.

Example 3

In a mixer, 5 kg of sodium phosphate, 7 kg of sodium borate, 3 kg of benzotriazole, 5 kg of sodium benzoate and 880 kg of deionized water are added simultaneously with stirring until all the materials is completely dissolved and the solution is ready for use. Then, 3.5 kg of citric acid is added to the dissolved content with stirring until all the materials are completely dissolved and the solution is ready for use. In a separate mixer, 3 kg of 2-mercaptobenzothiazole, 110 kg of deionized water and 3.5 kg of sodium hydroxide are added simultaneously, stirred and heated till boiling, and immediately added to the above-mentioned ready-for-use content while they are still hot. Also in the above-mentioned content, 3 kg of 2 (sodium-sulfophenyl) ethylsiloxane are added over 30 minutes with stirring until pH of the solution is adjusted to 8.5. In a separate mixer, 3 kg of sodium silicate and 110 kg of deionized water are added with stirring; after the materials are dissolved, the solution is added over 30 minutes to the content obtained from last step and continue to be stirred; and the pH of the solution is adjusted to 10.5 with sodium hydroxide after the content is mixed homogeneously, and the solution is ready for use. Finally, 800 kg of ethylene glycol, 0.2 kg of block polyether and 0.22 kg of dye are added to the just ready content with stirring to obtain the final product.

Example 4

In a mixer, 7 kg of sodium phosphate, 5 kg of sodium borate, 3.5 kg of benzotriazole, 7 kg of sodium benzoate and 960 kg of deionized water are added simultaneously with stirring until all the materials are completely dissolved and the solution is ready for use. Then 3 kg of citric acid is added to the dissolved content with stirring until all the materials are completely dissolved and the solution is ready for use. In a separate mixer, 4 kg of 2-mercaptobenzothiazole, 120 kg of deionized water and 3 kg of sodium hydroxide are added simultaneously, stirred and heated till boiling, and immediately added to the above-mentioned ready-for-use content while they are still hot. Also in the above-mentioned content, 3.5 kg of 3-(sodium sulphonate) propylsiloxane is added with over 30 minutes with stirring until the pH of the solution is adjusted to 8.5 with sodium hydroxide. In a separate mixer, 3.5 kg of sodium silicate and 120 kg of deionized water are added with stirring, which is later added to the content obtained from last step and continue to be stirred; and after the content is mixed homogeneously, the pH of the solution is adjusted to 11 with sodium hydroxide; and the solution is ready for use. Finally, 900 kg of ethylene glycol, 0.22 kg of block polyether and 0.20 kg of dye are added to the just ready content with stirring to obtain the final product.

Example 5

In a mixer, 8 kg of sodium phosphate, 3 kg of sodium borate, 4 kg of benzotriazole, 8 kg of sodium benzoate and 1040 kg of deionized water are added simultaneously with stirring until all the materials are completely dissolved and the solution is ready for use. Then, 2 kg of citric acid is added to the dissolved materials with stirring until all the materials are completely dissolved and the solution is ready for use. In a separate mixer, 5 kg of 2-mercaptobenzothiazole, 130 kg of deionized water and 2 kg of sodium hydroxide are added simultaneously, stirred and heated till boiling, and immediately added to the above-mentioned ready-for-use content while they are still hot. Also in the above-mentioned content, 4 kg of (sodium sulphonate-2-hydrox-propoxy) propylsiloxane is added over 30 minutes with stirring until the pH of the solution is adjusted to 9 with sodium hydroxide. In a separate mixer, 4 kg of sodium silicate and 130 kg of deionized water are added with stirring, which is later added over 30 minutes to the content obtained from last step and continue to be stirred; and after the content are mixed homogeneously, the pH of the solution is adjusted to 10.8 with sodium hydroxide; and the solution is ready for use. Finally, 1100 kg of ethylene glycol, 0.25 kg of block polyether and 0.15 kg of dye are added to the just ready content with stirring to obtain the final product.

Example 6

In a mixer, 10 kg of sodium phosphate, 1 kg of sodium borate, 5 kg of benzotriazole, 10 kg of sodium benzoate and 1120 kg of deionized water are added simultaneously with stirring until all the materials are completely dissolved and the solution is ready for use. Then 1 kg of citric acid is added to the dissolved materials with stirring until all the materials are completely dissolved and the solution is ready for use. In a separate mixer, 1 kg of 2-mercaptobenzothiazole, 140 kg of deionized water and 1 kg of sodium hydroxide are added simultaneously, stirred and heated till boiling, and immediately added to the above-mentioned ready-for-use content while they are still hot. Also in the above-mentioned content 5 kg of (2,3-dihydroxylpropoxy) propylsiloxane is added over 30 minutes with stirring until pH of the solution is adjusted to 8.7 with sodium hydroxide. In a separate mixer, 5 kg of sodium silicate and 140 kg of deionized water are added with stirring, which solution is later added over 30 minutes to the above-mentioned content obtained from last step with stirring; and after the content is mixed homogeneously, the pH of the solution is adjusted to 11 with sodium hydroxide; and the solution is ready for use. Finally, 1200 kg of ethylene glycol, 0.3 kg of block polyether and 0.1 kg of dye are added to the just ready content with stirring to obtain the final product.

What is claimed is:

1. A method for making a cooling fluid for engines, comprising the following steps:
    a) mixing 1-10 parts of sodium phosphate, 1-10 parts of sodium borate, 1-5 parts of benzotriazole, 1-10 parts of sodium benzoate and 80% of 800-1400 parts of deionized water with stirring, until dissolved completely;
    b) adding to the solution formed in step a) 1-5 parts of citric acid with stirring until all said citric acid is dissolved completely;
    c) separately mixing 1-5 parts of 2-mercaptobenzothiazole, 10% of 800-1400 parts of deionized water, and 1-5 parts of sodium hydroxide with stirring, heating to boiling point, and then adding to b) while still hot;
    d) adding 1-3 parts of a silicate stabilizing agent over 30 minutes with stirring, adjusting the pH to pH 8-9 by adding sodium hydroxide;
    e) separately mixing 1-3 parts of sodium silicate and 10% of 800-1400 parts of deionized water with stirring until said sodium silicate is dissolved, then adding to d) over 30 minutes with stirring; and adjusting the pH with sodium hydroxide to a pH of 10-11, until homogeneous; and
    f) adding 600-1200 parts of ethylene glycol, 0.1-0.3 parts of a defoaming agent, and 0.1-0.3 parts of a dye with stirring until homogeneous.

2. The method according to claim 1, wherein said silicate stabilizing agent is one selected from the group consisting of 3-(trihydroxymethylsiloxane)-propyl-monoester of phosphoric acid phosphate; sulfonate propylsiloxane; 2-(sodium-sulfophenyl) ethylsiloxane; 3-(sodium sulphonate) propylsiloxane; 3-(sodium sulphonate2-hydroxyl-propoxy) propylsiloxane and (2,3-dihydroxylpropoxy) propylsiloxane.

3. The method according to claim 1 wherein said defoaming agent is block polyether.

4. A method for making a cooling fluid for engines, the method comprising: (a) mixing between about 1 and 10 kg of sodium phosphate, between about 1 and 10 kg of sodium borate, between about 1 and 5 kg of benzotriazole, between about 1 and 10 kg of sodium benzoate and between about 640 and 1120 kg of deionized water with stirring until completely dissolved and a solution is formed; (b) adding between about 1 and 5 kg of citric acid to the solution formed in step (a) with stirring until completely dissolved; (c) separately mixing between about 1 and 5 kg of 2-mercaptobenzothiazole, between about 80 and 140 kg of deionized water and between about 1 and 5 kg of sodium hydroxide with stirring, heated to boiling, and immediately adding to (b); (d) adding between about 1 and 5 kg of a silicate stabilizing agent selected from the group consisting of 3-(trihydroxymethylsiloxane)-propyl-monoester of phosphoric acid phosphate; sulfonate propylsiloxane; 2-(sodiumsulfophenyl) ethylsiloxane; 3-(sodium sulphonate) propylsiloxane; 3-(sodium sulphonate2-hydroxyl-propoxy) propylsiloxane and (2,3-dihydroxylpropoxy) propylsiloxane over 30 minutes with stirring, and adjusting the pH to about 8 and 9 with sodium hydroxide; (e) separately mixing between about 1 and 5 kg of sodium silicate and between about 80 and 140 kg of deionized water with stirring and when dissolved, adding to (d) over 30 minutes with stirring; and adjusting the pH to between about 10 and 11 with sodium hydroxide; and (f) adding between about 600 and 1200 kg of ethylene glycol, between about 0.1 and 0.3 kg of block polyether and between about 0.1 and 0.3 kg of dye to (e) with stirring.

5. The method of claim 4, wherein in step (a) sodium phosphate is added in the amount of about 1 kg, sodium borate is added in the amount of about 10 kg, benzotriazole is added in the amount of about 1 kg, sodium benzoate is added in the amount of about 1 kg to about 640 kg of deionized water with stirring; wherein in step (b) citric acid is added in the amount of about 5 kg to the solution formed in step a) with stirring; wherein in step (c) 2-mercaptobenzothiazole in the amount of about 1 kg is separately mixed with about 80 kg of deionized water and about 5 kg of sodium hydroxide and immediately added to (b) with stirring; wherein in step (d) the silicate stabilizing agent is 3-(trihydroxymethylsiloxane)-propane-monoester of phosphoric acid phosphate, added in the amount of about 1 kg over 30 minutes with stirring, and the pH adjusted to about 8 with sodium hydroxide; wherein in step (e) sodium silicate in the amount of about 1 kg is separately mixed with about 80 kg of deionized water and when dissolved added to (d) over 30 minutes with stirring and the pH adjusted to about 11 with sodium hydroxide; and wherein in step (f) ethylene glycol in the amount of about 600 kg, block polyether in the amount of about 0.1 kg and dye in the amount of about 0.3 kg are added with stirring.

6. The method of claim 4, wherein in step (a) sodium phosphate is added in the amount of about 3 kg, sodium borate is added in the amount of about 8 kg, benzotriazole is added in the amount of about 2 kg, sodium benzoate is added in the amount of about 3 kg, to about 800 kg of deionized water with stirring; wherein in step (b) citric acid is added in the amount of about 4 kg to the solution formed in step a) with stirring; wherein in step (c) 2-mercaptobenzothiazole in the amount of about 2 kg is separately mixed with about 100 kg of deionized water and about 4 kg of sodium hydroxide and immediately added to (b) with stirring; wherein in step (d) the silicate stabilizing agent is sulphonate propylsiloxane added in the amount of about 2 kg over 30 minutes with stirring, and the pH is adjusted to about 9 with sodium hydroxide; wherein in step (e) sodium silicate in the amount of about 2 kg is separately mixed with about 100 kg of deionized water and when dissolved added to (d) over 30 minutes with stirring and the pH adjusted to about 10 with sodium hydroxide; and wherein in step (f) ethylene glycol in the amount of about 700 kg, block polyether in the amount of about 0.15 kg and dye in the amount of about 0.25 kg are added with stirring.

7. The method of claim 4, wherein in step (a) sodium phosphate is added in the amount of about 5 kg, sodium borate is added in the amount of about 7 kg, benzotriazole is added in the amount of about 3 kg, sodium benzoate is added in the amount of about 5 kg, to about 880 kg of deionized water with stirring; wherein in step (b) citric acid is added in the amount of about 3.5 kg to the solution formed in step a) with stirring; wherein in step (c) 2-mercaptobenzothiazole in the amount of about 3 kg is separately mixed with about 110 kg of deionized water and about 3.5 kg of sodium hydroxide and immediately added to (b) with stirring; wherein in step (d) the silicate stabilizing agent is 2-(sodiumsulphonyl) ethylsiloxane added in the amount of about 3 kg over 30 minutes with stirring, and the pH is adjusted to about 8.5 with sodium hydroxide; wherein in step (e) sodium silicate in the amount of about 3 kg is separately mixed with about 110 kg of deionized water and when dissolved added to (d) over 30 minutes with stirring and the pH adjusted to about 10.5 with sodium hydroxide; and wherein in step (f) ethylene glycol in the amount of about 800 kg, block polyether in the amount of about 0.2 kg and dye in the amount of about 0.22 kg are added with stirring.

8. The method of claim 4, wherein in step (a) sodium phosphate is added in the amount of about 7 kg, sodium borate is added in the amount of about 5 kg, benzotriazole is added in the amount of about 3.5 kg, sodium benzoate is added in the amount of about 7 kg to about 960 kg of deionized water with stirring; wherein in step (b) citric acid is added in the amount of about 3 kg to the solution formed in step a) with stirring; wherein in step (c) 2-mercaptobenzothiazole in the amount of about 4 kg is separately mixed with about 120 kg of deionized water and about 3 kg of sodium hydroxide and immediately added to (b) with stirring; wherein in step(d) the silicate stabilizing agent is 3-(sodiumsulphonate) propylsiloxane added in the amount of about 3.5 kg over 30 minutes with stirring, and the pH is adjusted to about 8.5 with sodium hydroxide; wherein in step (e) sodium silicate in the amount of about 3.5 kg is separately mixed with about 120 kg of deionized water and when dissolved added to (d) over 30 minutes with stirring and the pH adjusted to about 11 with sodium hydroxide; and wherein in step (f) ethylene glycol in the amount of about 900 kg, block polyether in the amount of about 0.22 kg and dye in the amount of about 0.20 kg are added with stirring.

9. The method of claim 4, wherein in step (a) sodium phosphate is added in the amount of about 8 kg, sodium borate is added in the amount of about 3 kg, benzotriazole is added in the amount of about 4 kg, sodium benzoate is added in the amount of about 8 kg to about 1040 kg of deionized water with stirring; wherein in step (b) citric acid is added in the amount of about 2 kg to the solution formed in step a) with stirring; wherein in step (c) 2-mercaptobenzothiazole in the amount of about 5 kg is separately mixed with about 130 kg of deionized water and about 2 kg of sodium hydroxide and immediately added to (b) with stirring; wherein in step (d) the silicate stabilizing agent is (sodiumsulphonate)-2-hydroxypropoxy) propylsiloxane added in the amount of about 4 kg over 30 minutes with stirring, and the pH is adjusted to about 9 with sodium hydroxide; wherein in step (e) sodium silicate in the amount of about 4 kg is separately mixed with about 130 kg of deionized water and when dissolved added to (d) over 30 minutes with stirring and the pH adjusted to about 10.8 with sodium hydroxide; and wherein in step (f) ethylene glycol in the amount of about 1100 kg, block polyether in the amount of about 0.25 kg and dye in the amount of about 0.15 kg are added with stirring.

10. The method of claim 4, wherein in step (a) sodium phosphate is added in the amount of about 10 kg, sodium borate is added in the amount of about 1 kg, benzotriazole is added in the amount of about 5 kg, sodium benzoate is added in the amount of about 10 kg, to about 1120 kg of deionized water with stirring; wherein in step (b) citric acid is added in the amount of about 1 kg to the solution formed in step a) with stirring; wherein in step (c) 2-mercaptobenzothiazole in the amount of about 1 kg is separately mixed with about 140 kg of deionized water and about 1 kg of sodium hydroxide and immediately added to (b) with stirring; wherein in step (d) the silicate stabilizing agent is (2,3-dihydroxypropoxy) propylsiloxane added in the amount of about 5 kg over 30 minutes with stirring, and the pH is adjusted to about 8.7 with sodium hydroxide; wherein in step (e) sodium silicate in the amount of about 5 kg is separately mixed with about 140 kg of deionized water and when dissolved added to (d) over 30 minutes with stirring and the pH adjusted to about 11 with sodium hydroxide; and wherein in step (f) ethylene glycol in the amount of about 1200 kg, block polyether in the amount of about 0.3 kg and dye in the amount of about 0.1 kg are added with stirring.

* * * * *